May 23, 1933.　　　W. B. KINNER　　　1,910,611
AIRPLANE FOLDING WING
Filed April 2, 1932　　　4 Sheets-Sheet 1
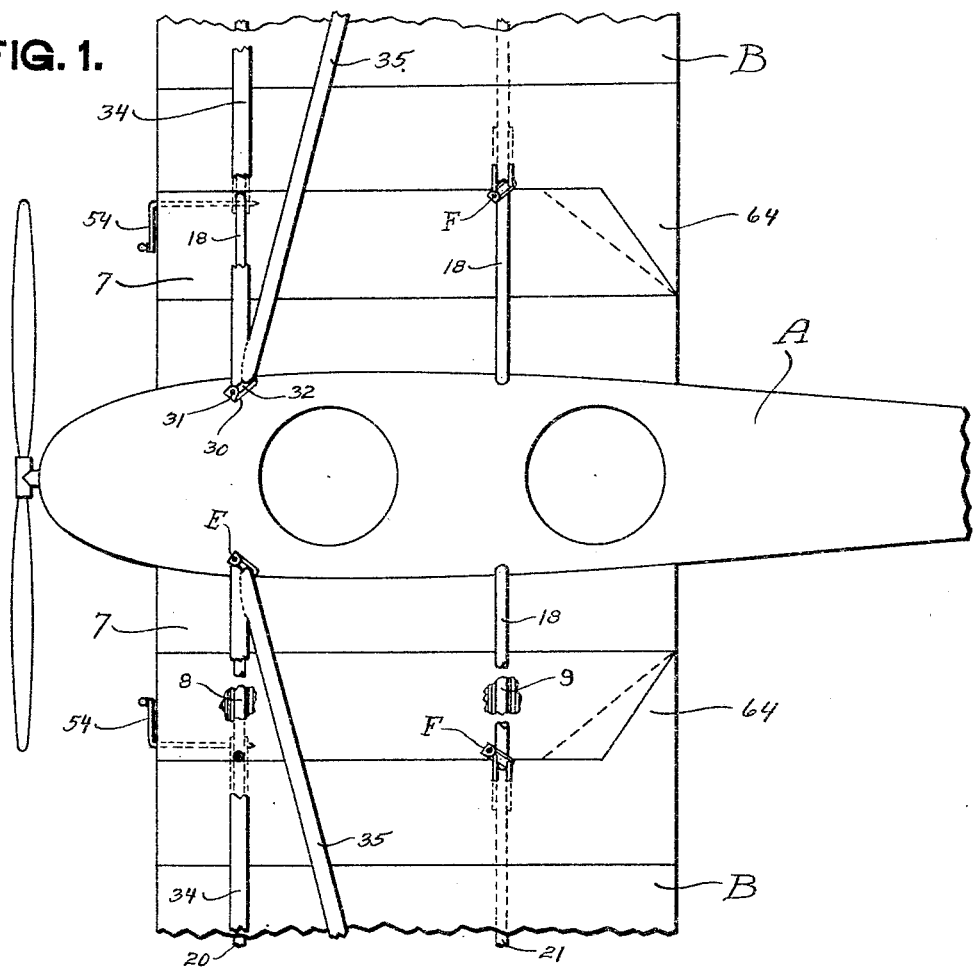
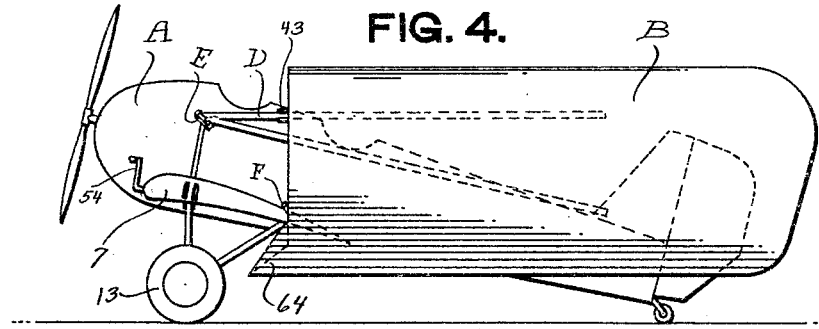
INVENTOR.
Winfield B. Kinner
BY Lancaster, Allwine and Rommel
ATTORNEYS.

May 23, 1933.　　　W. B. KINNER　　　1,910,611
AIRPLANE FOLDING WING
Filed April 2, 1932　　　4 Sheets-Sheet 2

INVENTOR.
Winfield B. Kinner

BY Lancaster, Allwine and Rommel
ATTORNEYS.

May 23, 1933.   W. B. KINNER   1,910,611
AIRPLANE FOLDING WING
Filed April 2, 1932   4 Sheets-Sheet 3

INVENTOR.
Winfield B. Kinner
BY Lancaster, Allwine & Rommel
ATTORNEYS.

May 23, 1933.  W. B. KINNER  1,910,611
AIRPLANE FOLDING WING
Filed April 2, 1932  4 Sheets-Sheet 4

INVENTOR.
Winfield B. Kinner

BY Lancaster, Allwine and Rommel
ATTORNEYS.

Patented May 23, 1933

1,910,611

UNITED STATES PATENT OFFICE

WINFIELD BERTRAM KINNER, OF GLENDALE, CALIFORNIA

AIRPLANE FOLDING WING

Application filed April 2, 1932. Serial No. 602,778.

The present invention relates to aircraft and more particularly to folding wings for airplanes.

The primary object of the invention is to provide an airplane having a construction whereby the wings may be folded to positions along the sides of the fuselage so as to decrease the amount of storage space required for housing the airplane.

A further object of the invention is to provide a folding wing airplane wherein the wings may be easily prepared for folding and having a construction eliminating the usual hinge flaps and other sealing devices for the wing joint which need to be opened before the wings may be folded.

A further object of the invention is to provide a low wing monoplane having folding wings having a compound folding action whereby the wings may be folded from the flying position substantially parallel to the ground, to a position along the fuselage with the chord of the wings in a substantially vertical position.

A further object of the invention is to provide a low wing monoplane having folding wings and external bracing for the wings arranged to remain in fixed relation to the wings when either in a flying or in a folded position.

A further object of the invention is to provide a folding wing for low wing monoplanes embodying a novel hinge arrangement wherein the wings pivot about axes arranged in a forwardly and upwardly converging relation.

A still further object resides in the novel form of locking device for retaining the wings in a flying position and the arrangement whereby an efficient seal is formed at the joint of the trailing edge of the wings when in a flying position.

Other objects and advantages of the invention will be apparent during the course of the following detailed description, taken in connection with the accompanying drawings, forming a part of this specification, and in which drawings, Figure 1 is a fragmentary top plan view of the airplane and showing the wings in an extended or flying position.

Figure 4 is a view in side elevation and showing the wings folded.

Figure 2:
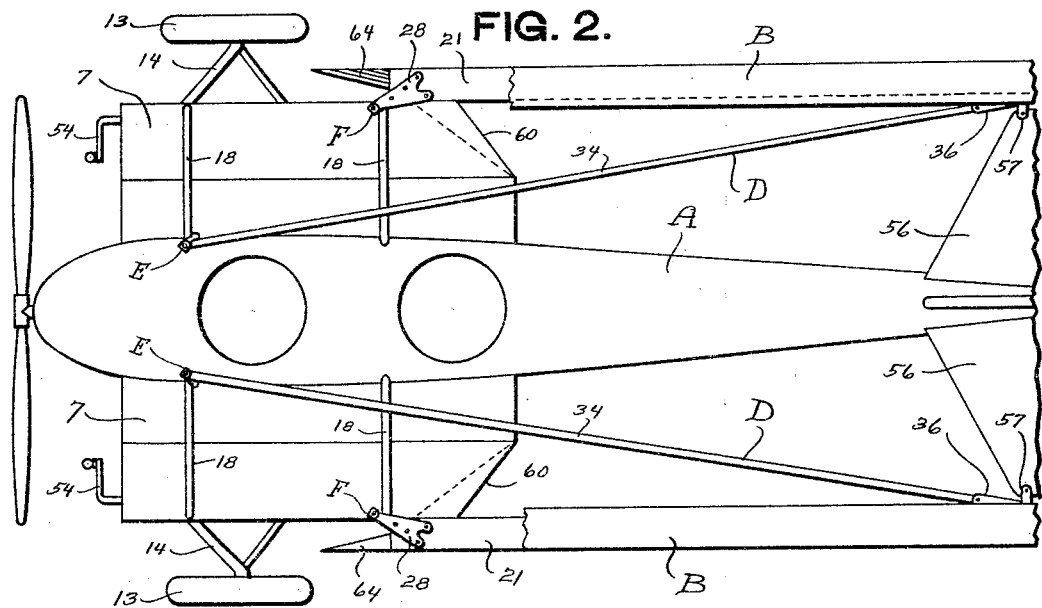
Figure 2 is a top plan view showing the wings in a folded position.

Referring to the drawings in detail and wherein similar reference characters designate corresponding parts throughout the several views, the letter A designates the fuselage of the airplane having the folding wings B held in a spread or flying position by the retaining means C. The wings B are each provided with bracing means D having hinged connection with the fuselage A by the hinge means E, the wings B having a hinge means F having their axes aligning with the axes of the hinge means E of the respective wings.

The airplane is of the low wing monoplane type wherein the wings extend laterally from the lower portion of the fuselage. The fuselage may be of any preferred construction and in the example shown the fuselage framing includes the longerons 5 and braces 6. Projecting from each side of the fuselage are the stub wings 7 each embodying the usual front and rear spars 8 and 9 respectively. The stub wings 7 may be provided with the usual ribs 10 for giving the proper camber to the surfaces of the stub wings. The stub wings 7 are provided with the usual covering 11 and at their outer ends are closed between the rear spar and leading edge by a covering 12 as clearly shown in Figure 6.

Figure 3:
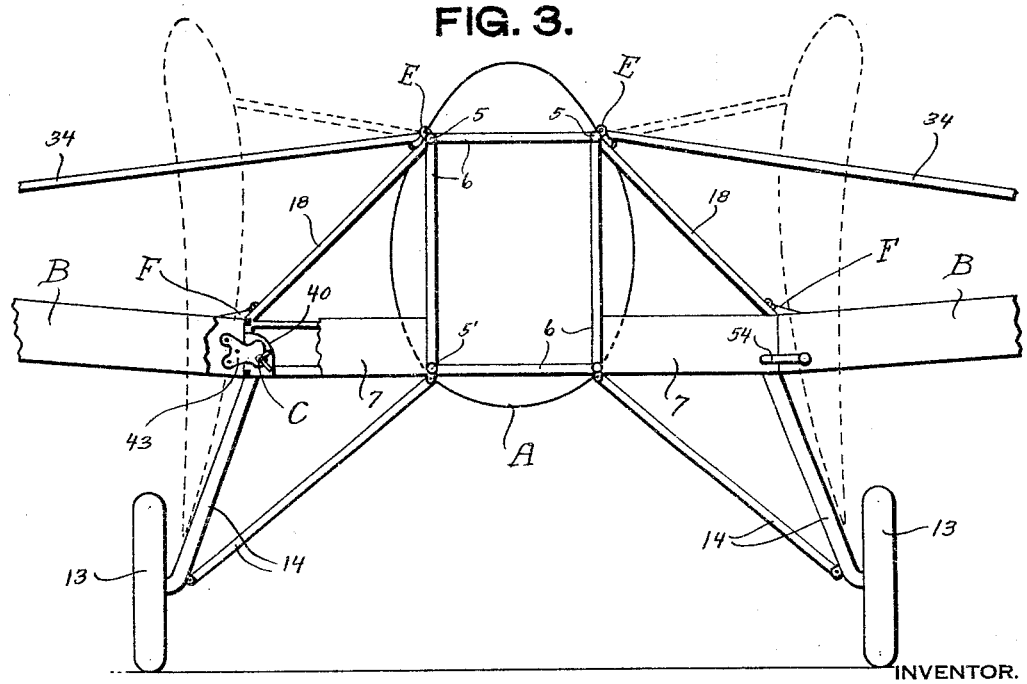
Figure 3 is a diagrammatic front plan view showing in full lines the wings extended and in dotted lines showing the wings folded to reduce the span to within the width of the landing gear.
Figure 5:
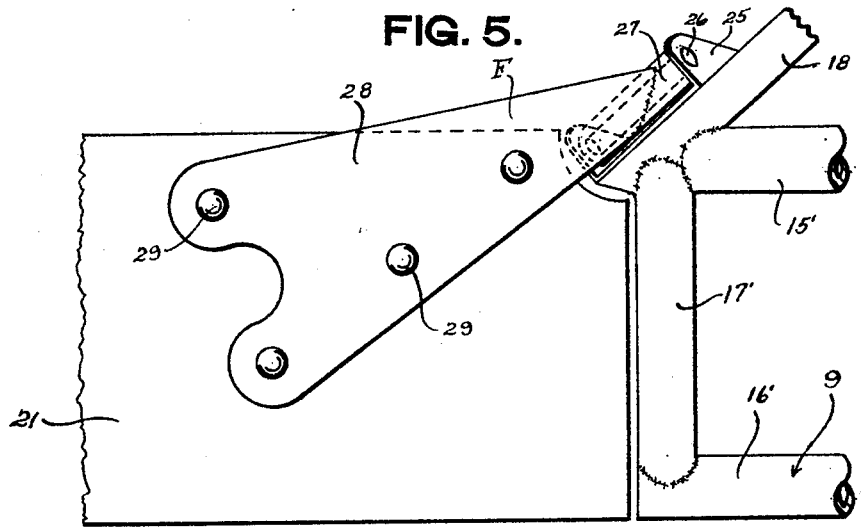
Figure 5 is an enlarged fragmentary detail view of the hinge mounting for the rear spar of the wings.

The landing gear includes the usual landing wheels 13 connected by the usual struts 14 to the fuselage framing and the outer end of the stub wings 7. By observing Figures 2 and 3 it will be seen that the span of the stub wings 7 is less than the distance between the landing wheels 13 so that the wings B when folded will be disposed inwardly of the plane of the landing wheels.

While the spars 8 and 9 of the stub wings may be of any preferred type in the example shown these spars are formed of tubular material, the front spar including upper and lower tubes 15 and 16 respectively joined at their ends by the vertical tube 17, while the rear spar 9 includes upper and lower horizontal tubes 15' and 16' respectively joined at their outer ends by the vertical tube 17'. The tubes of the spars 8 and 9 are preferably connected by weld joints. Connecting the outer end of each stub spar 8 and 9 with the upper longérons 5 is an external diagonal brace 18. These diagonal braces 18 may be stream-lined and at their outer lower ends are preferably connected by a weld joint to their respective stub spars.

Referring now to the construction of the main wings B, each includes a front or main spar 20 and a rear spar 21 adapted to respectively align with the stub spars 8 and 9 when the wings are in an extended or flying position. The spars are joined by the forming ribs 22 over which the covering 23 is provided. The inner ends of the wings B are preferably covered from the leading edge to the rear spar 21 by the covering 24 which abuts the covering 12 when the wings are extended.

Referring now to the means for hingedly mounting the main wings B upon the stub wings 7 to permit folding of the main wings to a position longitudinally of the fuselage A, the wings have one direct hinge connection at their rear portions with the stub wings by the hinge means F and a second hinge connection to the fuselage framing through bracing means D by the hinge means E. The axes of the companion hinge joints E and F are in alignment and the angle of these joints determines the position of the wings when folded. The hinge axes of the main wings B extend in upwardly and forwardly converging relation and preferably at such an angle that when the wings are folded along the fuselage have their longitudinal axis extending substantially parallel to the ground surface as shown in Figure 4.

The hinge means F providing a direct hinge connection between the main wings and the stub wings, each comprises a hinge yoke 25 welded to the lower end of the rear diagonal braces 18 and carrying a hinge pin 26 with the axes of the hinge pins 26 converging upwardly and forwardly of the fuselage A. Rotatable on each hinge pin 26 is a sleeve member 27 and these sleeve members have welded thereto a pair of parallel anchoring straps 28 for receiving therebetween the inner ends of the rear spars 21. The hinge straps 28 are secured by the fastening elements 29 to the rear spars 21. Thus the hinge means F form hinge joints pivotally connecting the rear portions of the main wings B to the outer ends of the stub wings 7 in such manner whereby the straight cut ends of the main and stub wings will abut one another when the main wings are extended.

The hinge means E comprises a hinge yoke 30 which may be welded to the upper end of each of the front diagonal braces 18 where they connect with the fuselage framing along the upper longérons 5. The hinge pins 31 axially align with the hinge pins 26 and have mounted thereon suitable sleeves 32. The hinged bracing means D for each main wing B are in the form of V-braces embodying front and rear struts 34 and 35 respectively, suitably connected at their outer ends as by the fixtures 36 to the main wing spars, the front strut 34 being connected to the front spar 20 and the rear strut 35 being connected to the rear spar 21. The inner converging ends of the struts 34 and 35 are connected by a weld joint and the joined ends of the struts are in turn connected by a weld joint to the sleeve 32 pivoted on the hinge pin 31. Thus the lower rear hinge means F and upper front hinge means E due to their angular relation to the fuselage A provide a compound folding action of the wings whereby the main wings when in a folded position are disposed in planes at a right angle to the flying position of the wings.

Referring now to the retaining means C for securing the main wings B in a flying position abutting the stub wings 7, this retaining means for each wing comprises a pair of gusset plates 40 carried by the outer ends of the front stub spars 8. In the example shown, these gussets 40 have been shown welded to the tubes 16 and 17. Secured to the inner end of each front or main spar 20 as by suitable fastening elements 42 is a pair of anchoring plates 43 having portions projecting beyond the ends of the spar adapted to straddle the gussets 40. The projecting portions of the anchoring plates 43 are provided with axially aligning circular openings 44 which when the wings B are in a flying position axially align with circular openings 45 provided in the gussets 40 inwardly of the tubes 17. The openings 44 and 45 when axially aligned are adapted to receive an axially movable retaining pin 46 including a plain terminal portion 47 for extending thru the overlapping plates 40 and 43, and a threaded shank portion 48 provided at its ends with a wrench square 49. These retaining pins 46 are arranged between the front stub spars and the leading edges of the stub wings with their axes substantially parallel to the longitudinal axis of the fuselage. Mounted forwardly of the front stub spars as by suitable braces 50 and axially aligning with the openings 45 is an internally threaded feed member 51 which may be in the form of a threaded nut welded to the ends of the braces 50. The braces 50 are preferably welded to one of the gussets 40 and are arranged so as to not interfere with the anchoring plates 43. The feed member 51 is arranged for threaded reception of the threaded shank portion 48 whereby upon rotation of the retaining pin, the plain terminal portion 47 may be moved longitudinally for connecting and disconnecting the anchoring plates 43. A crank 52 is provided for rotating the retaining member 46 and has a socket at its inner end for receiving the wrench square 49. Each crank 52 is supported in a suitable brace 53 and is provided with a handle portion 54 arranged forwardly of the leading edge of the stub wings. Thus the wings may be prepared for folding by merely rotating the pins 46 by the cranks 52 for withdrawing the pin portions 47 from the overlapping plates 40 and 43. The covering 12 of the stub wings 7 may be provided with suitable slots 55 for receiving the projecting portions of the anchoring plates 43.

When the wings are in a folded position the wings may be fastened to the stabilizer 56 by suitable catches 57.

Figure 6:
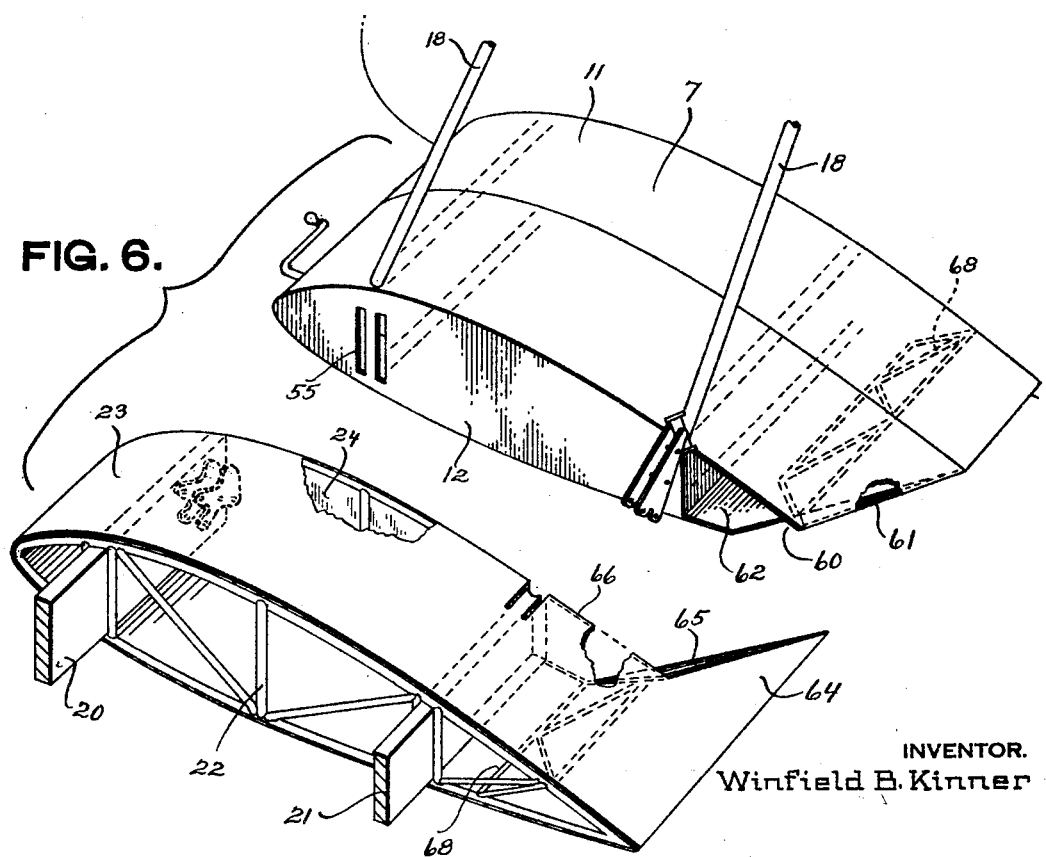
Figure 6 is a fragmentary perspective view showing the relation of one of the main wings to its stub wing and showing the sealing joints for the trailing edge of the wing.
Figure 7:
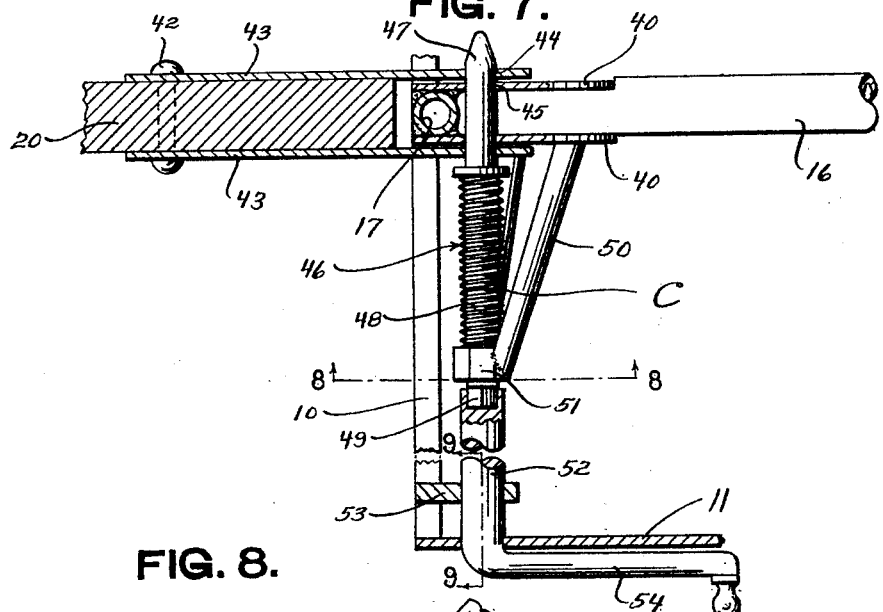
Figure 7 is a detail sectional view of the coupling means for retaining the wings in a spread position, the section being taken substantially on the line 7—7 of Figure 8.
Figure 8:
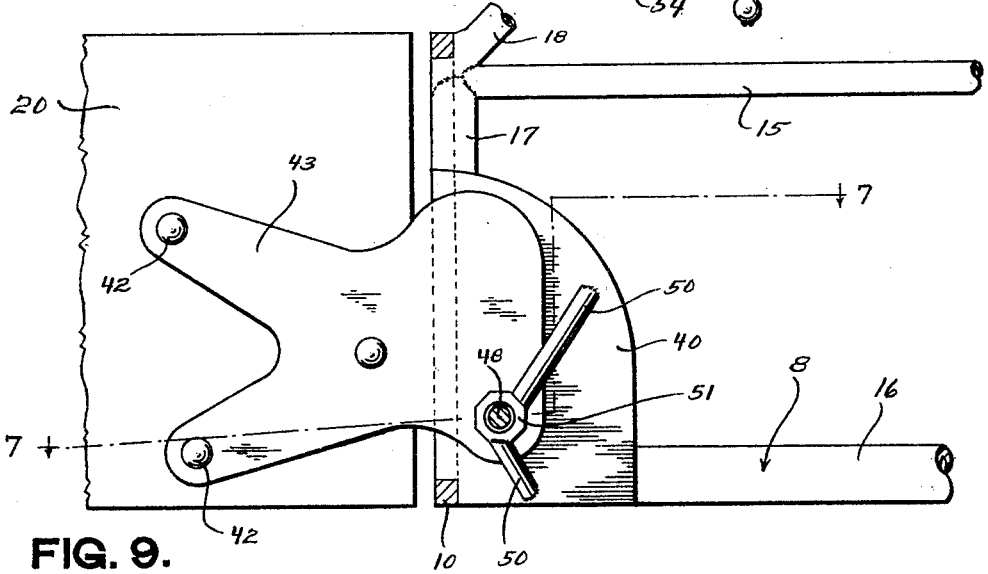
Figure 8 is a section substantially on the line 8—8 of Figure 7.
Figure 9:
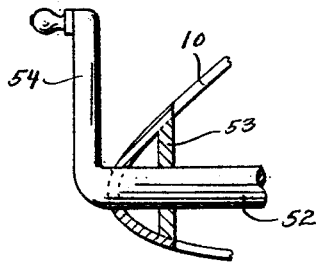
Figure 9 is a fragmentary section on the line 9—9 of Figure 7.

Referring now to the sealing arrangement for the trailing edge of the wings, each of the stub wings 7 has the outer end of its trailing edge provided with a triangular undercut 60 with the undersurface of the wing cut at a greater angle than that of the upper surface as clearly shown in Figure 6 and by dotted lines in Figure 1. A portion of this undercut adjacent the trailing edge is provided with a covering 61 providing a downwardly and outwardly facing surface. Between the covering 61 and rear stub spar 9 the ends of the coverings are left uncovered as at 62 and the reason for this uncovered portion 62 will be subsequently explained. Each of the main wings B is provided at the inner end of its trailing edge with a triangular-shaped extension 64 conforming to the shape of the undercut 60 and having its upper surface provided with a covering 65 adapted to abut the covering 61 when the wings are in an extended position. This overlapping of the trailing edges of the stub and main wings eliminates the use of flaps or other arrangements which are required to be opened before the wings may be folded. The object in leaving the open space 62 is to permit proper folding and opening of the wings since during this movement the edge portion 66 in Figure 6 extends slightly into the opening 62 during turning movement of the wing. When the wing is folded, the edge portion 62 swings in an arc extending slightly into the opening 62 and would strike the end covering 12 were it continued beyond the rear stub spar. The covering of the opening 62 is immaterial, since the opening is only exposed while the wing is in its folded position. The trailing edges of the stub and main wings may be braced by suitable internal braces 68.

When preparing the wings for folding, the operator merely rotates the shanks 52 for withdrawing the threaded retaining pins 46 from the overlapping plates 40 and 43 and the wings may then be easily swung about the hinge means E and F with a compound folding action into positions extending longitudinally of the fuselage A. Owing to the angular position of the aligning wing and strut hinges F and E respectively, the wings will be swung from a horizontal plane to a vertical plane and this vertical position of the wings when folded depends upon the location and angle of the aligning hinge means. It will be noted that with the particular hinge arrangements, the bracing means D remains in a fixed relation to the main wings when either in an extended or folded position.

Thus it will be seen that a folding wing airplane has been disclosed embodying a novel arrangement whereby the wings may be quickly and easily folded by merely retracting a screw threaded retaining member. It will further be apparent that the novel hinge arrangement allows for the wings to be properly braced when extended and allows for the wings to be folded into positions whereby the spread of the airplane is reduced to within the width of the landing gear.

Changes in detail may be made to the form of invention herein shown and described, without departing from the spirit of the invention or the scope of the claims.

I claim:

1. In a folding wing airplane, a fuselage having stub wings, a main wing abutting each stub wing, a lower rear hinge joint connecting the rear portion of each main wing to its stub wing, said hinge joints being inclined upwardly and toward the fuselage, an external V-brace including diverging struts secured at their outer ends to the main wings, a forward upper hinge joint connecting the apex of the V-braces to the upper portion of the fuselage and having their axes aligning with the lower rear hinge joints, anchoring devices carried by the forward portion of each main wing, and a retractible retaining pin carried by each stub wing for engaging the anchoring devices to secure the main wings in a flying position.

2. In a folding wing airplane, a fuselage having stub wings, each embodying a front and rear spar, a main wing abutting each stub wing and each embodying a front spar and a rear spar aligning with corresponding spars of the stub wings, a hinge joint connecting the main wings to the stub wings at the rear spars thereof with the axes of the hinge joints converging upwardly and forwardly, a V-brace for each main wing, a hinge joint connecting the apex of each V-brace to the fuselage on axes aligning with the first mentioned hinge joints, anchoring plates carried by the front spar of each main wing, and retaining means carried by each stub wing forwardly of the front spars thereof for locking engagement with the anchoring plates to retain the main wings in a flying position.

3. In a folding wing airplane, a fuselage having stub wings, said stub wings at the outer end of their trailing edges being provided with a triangular under-cut, a main wing abutting each stub wing, hinge mounting means for each main wing permitting a compound folding action of the main wings, to positions longitudinally of the fuselage, retaining means for securing the main wings in a flying position, and a triangular shaped extension provided at the inner end of each main wing at the trailing edge thereof and abutting with the under-cut of the stub wing.

4. In a folding wing airplane, a stub wing having an under-cut at the outer end of its trailing edge, and a folding main wing having a triangular extension at the inner end of each trailing edge for filling the under-cut and maintaining the contour of the stub wing when the folding wing is in a flying position.

5. In a folding wing airplane, a fuselage having stub wings, a main wing abutting each stub wing, a lower outboard hinge joint connecting each main wing to its stub wing, an external strut bracing fixedly secured to each main wing, an inboard hinge joint connecting each strut bracing to the fuselage and axially aligning with the lower outboard hinge joint whereby the main wings have a compound folding action to positions longitudinally of the fuselage, and means for securing the main wings in a flying position.

6. In a folding wing airplane, a fuselage having stub wings each embodying a front and a rear spar, a main wing abutting each stub wing and each embodying a front spar and a rear spar to align with corresponding spars of the stub wings, a hinge joint connecting the main wings to the stub wings at the rear spars thereof, strut bracing for each main wing, a hinge joint connecting each strut bracing to the fuselage inwardly of and in axial alignment with the first mentioned hinge joint whereby the main wings have a compound folding action to positions longitudinally of the fuselage, and means for securing the wings in a flying position at the front spars of the wings.

7. In a folding wing airplane of the low wing monoplane type, a fuselage having stub wings projecting from the lower portion thereof, a main wing abutting each stub wing, a rear hinge joint connection between the rear upper portion of each main wing and each stub wing at the outer edge of the stub wing, bracing for each main wing, a forward hinge joint connection between the bracing of each main wing and the upper portion of the fuselage inwardly of and axially aligning with the rear hinge joint whereby the main wings have a compound folding action to positions longitudinally of the fuselage, and retaining means for securing the main wings at their forward portions to their respective stub wings.

8. In a folding wing airplane, a fuselage provided with stub wings having substantial leading and trailing edges and having their outer edges extending parallel to the longitudinal axis of the fuselage, a main wing abutting each stub wing, a rear lower hinge connection connecting each main wing to each stub wing outboard of the fuselage at a point substantially aligning above the outer edge of the stub wing, strut bracing for each main wing, a forward upper hinge connection connecting each strut bracing to the fuselage inwardly of and in axial alignment with the rear lower hinge connections whereby the main wings have a compound folding action to positions longitudinally of the fuselage, and means for securing the main wings in a flying position.

WINFIELD BERTRAM KINNER.